Patented Oct. 13, 1942

2,298,833

UNITED STATES PATENT OFFICE 2,298,833

LUBRICANT

Clifford W. Muessig, Roselle, N. J., assignor, by mesne assignments, to Jasco, Incorporated, a corporation of Louisiana No Drawing. Application March 28, 1940,
Serial No. 326,400

5 Claims. (Cl. 252—58)

This invention relates to improved lubricants and methods for preparing them.

It is now found that normal mono-olefin hydrocarbon polymers of high molecular weight of a plastic to solid consistency, particularly such polymers of ethylene or propylene, when halogenated to a suitable degree, are made satisfactorily soluble in hydrocarbon oil and are capable of imparting to these oils improved lubricating characteristics.

The primary object of this invention is to provide an improved lubricant comprising a petroleum lubricating oil fraction and a blending agent that imparts improved viscosity characteristics to the art. A further object is to improve hydrocarbon lubricants with a blending agent containing stably combined halogen constituents which are beneficial to load-bearing properties of the lubricants. Further objects and advantages will be understood from the following description.

As distinguished from any known high molecular weight hydrocarbon polymers proposed as lubricants or lubricating oil addition agents, such as the polymers of iso-olefins, those of normal mono-olefins have been found capable of being more readily halogenated and of retaining their halogen constituents more firmly in chemical combination. The chlorinated normal mono-olefin polymers with a chlorine content of from 10% to 20% withstand decomposition at temperatures ranging up to 140° C., whereas chlorinated iso-olefin polymers when heated to temperatures in the range of 100–125° C. undergo decomposition and evolve quantities of hydrogen chloride. As further distinctions, the high molecular weight normal mono-olefin hydrocarbon polymers themselves are more difficultly soluble in hydrocarbon solvents than the iso-olefin polymers, but are much more stable to thermal decomposition and oxidation.

The high molecular weight polymers of normal mono-olefins are obtained by compressing a gaseous mono-olefin containing from 2–3 carbon atoms per molecule, e. g. ethylene or propylene, to a high subatmospheric pressure in excess of 500 atmospheres, and preferably within the range of 1000 to about 30,000 atmospheres, under controlled temperatures with a small quantity of oxygen in concentrations of from 0.01 to about 5% for catalytically accelerating the polymerization of the olefin. The polymerization reaction proceeds at moderately elevated temperatures in the range of 100° C. to 400° C. and preferably the temperature is kept in the range of 150–250° C. For a given concentration of oxygen, the molecular weight of the polymer is increased with relatively higher pressure and lower temperature conditions. The oxygen has an accelerating effect upon the reaction but in concentrations above an optimum of about a fraction of 1% tends to lower the molecular weight of the product.

As a specific example, ethylene polymers having molecular weights above 2000 are obtained when ethylene containing 0.05% oxygen is compressed in a steel bomb to a total pressure of 15,000 atmospheres and is heated to a temperature of 210° C. for about 5 hours. The polymer product, when cooled, is a plastic solid softening at a temperature of about 100° to 120° C. In chemical composition the polymers have a ratio hydrogen to carbon content of 2 to 1, which is indicative of the fact that the polymers are homologous and may be represented by the formula $H(-CH_2CH_2)_n=CH_2$, wherein the subscript $n$ denotes a high number of interlinked methylene radicals. The polymers are further characterized by a low miscibility with hydrocarbons in general, for they dissolve in xylene only by heating the solvent to near its boiling point.

Although the normal mono-olefin hydrocarbon polymers have a vanishingly small amount of unsaturation as their molecular weights increase and are not readily oxidized, nevertheless, they can be readily reacted with halogens even at ordinary temperatures without excessive decomposition through scissioning of the carbon to carbon bonds. For example, ethylene polymers having molecular weights ranging from about 2000 to 24,000 and with average molecular weights preferably in the range of 2000 to 12,000 are chlorinated in a solution of chloroform mixed with carbon tetrachloride at room temperature to secure a product having a desired chlorine content. The chlorinated polymers with a chlorine content of about 10 to 20% is much more soluble in viscous petroleum oils than the hydrocarbon polymer from which it is derived.

The halogenation may be effected with any suitable halogenating agent, such as a free halogen, and with the intervention of halogenating catalyst, such as inorganic halides, e. g. iodine, aluminum chloride or other Friedel-Crafts type catalyst. The reaction is preferably carried out in solution using a low boiling halogenated aliphatic compound as a solvent. Also, ultra-violet radiations may be used to accelerate the reactions.

To avoid substantial decomposition which would degrade the polymer and lower its molecular weight, it has been found desirable to maintain the halogen reaction temperature below 80° C. even though the reaction rate increases with the temperature. Thus, the chlorination is restricted so that the combined chlorine content of the polymers is preferably within the range of 10 to 20% by weight of the halogenated polymer. With a halogen content in this range, the halogenated polymer is sufficiently soluble in the high boiling hydrocarbon oils for the main objects of this invention, but for some purposes, a higher halogen content at the sacrifice of solubility may be desired.

The amount of the halogenated polymer added to the oil or lubricant is generally about 0.5 to 5% by weight, although, as low as 0.01% or as high as 10% or even higher are to be employed when required.

In general, the high molecular weight halogenated mono-olefin polymers are preferably blended with an oil having a Saybolt viscosity of at least about 30 seconds at 100° F. Such an oil may be obtained from any type of petroleum crude or be produced synthetically. The hydrocarbon base oil may be obtained by any of the known methods of refining; it may be waxy or dewaxed, treated by solvent extraction, acid clay, hydrogenation or otherwise improved.

In order to illustrate the invention, the following examples are given. An S. A. E. 20W lubricating oil having relatively poor viscosity characteristics was tested with and without an addition of a chlorinated ethylene polymer having a molecular weight of about 5600 and a chlorine content of 14%. The data from these tests on the viscosity characteristics of the oil, as a blank, and its blends are given in the following table:

| Lubricant composition | Saybolt viscosity at— | | Viscosity index |
|---|---|---|---|
| | 100° F. | 210° F. | |
| Blank oil | 275.8 | 45.9 | 13 |
| Blank oil+1% chlorinated polymer | 351.0 | 55.5 | 99 |
| Blank oil+2% chlorinated polymer | 527.0 | 73.0 | 120 |

From the table it can be seen that the addition of the chlorinated high molecular weight polymer considerably improves the oil in its viscosity index, which is a measure of the change in viscosity with respect to temperature as compared to a high quality Pennsylvania lubricating oil having a viscosity index of 100. It is to be noted that a small addition of the chlorinated polymer improves the low quality hydrocarbon lubricating oil to a considerable extent and is capable of even making such an oil surpass the highest quality natural hydrocarbon lubricating oils in viscosity characteristics. This improvement is of great value in providing lubricant for ordinary motors or machinery subjected to variations of temperature, and even in other uses of oil compositions having sufficiently high boiling ranges to adapt them for lubricating functions.

Furthermore, on account of the halogen content and adhesiveness imparted to the oil, the lubricant is given additional qualities desirable for maintaining an oil film on metal surfaces even under high loads.

Due to their ability to improve viscosity characteristics and film strength, the described halogenated polymers may be used as blending agents in various petroleum products higher boiling than gasoline, including Diesel fuels, lubricating oil fractions, waxes, asphaltic residua, and the like. They are thus suitable as compounding ingredients in greases or synthetic lubricants. Also, due to their film forming strength they are particularly adapted for compounding in extreme pressure lubricants. They may be used in these various compositions together with other addition agents such as pour point depressants, dyes, polymerization inhibitors, oxidation inhibitors, corrosion inhibitors, oiliness agents, various thickeners, sulfur compounds, etc. The halogenated polymers may also be subjected to modification by mechanical working or may be selectively fractionated prior to use in order to obtain any desired grade of the products for use in preparing a desired composition.

The present invention is not to be limited by any theory of the polymerization steps nor to the specific examples of how the material is procured and used, for various modifications are believed to come within the scope of the invention as defined in the appended claims.

I claim:

1. A lubricating composition comprising a lubricating oil blended with a minor proportion of a halogenated high molecular weight polymer of a normal mono-olefin containing 2 to 3 carbon atoms per molecule in a viscosity improving amount.

2. A lubricating composition comprising a petroleum lubricating oil blended with a minor proportion of a halogenated ethylene polymer of from plastic to solid consistency.

3. A composition of matter comprising a hydrocarbon oil having a viscosity above 30 Saybolt seconds at 100° F. and containing from 0.1 to 5% of chlorinated polymers of ethylene having an average molecular weight above 2,000 and a chlorine content of from 10 to 20%.

4. A lubricant comprising a lubricating oil blended with halogenated polymers of a normal olefin containing 2 to 3 carbon atoms per molecule, said polymers being homologous compounds represented by the formula: $H(-CH_2CH_2)_n=CH_2$ wherein the subscript $n$ denotes the number of interlinked methylene radicals, and said polymers having a molecular weight range from 2,000 to 24,000.

5. A composition of matter comprising a hydrocarbon oil higher boiling than gasoline and containing a minor proportion of a halogenated polymer of propylene, said polymer having a molecular weight above about 2,000.

CLIFFORD W. MUESSIG.